Dec. 5, 1933.  C. J. CRANE  1,937,511
SHOCK ABSORBER FOR VEHICLES
Filed April 29, 1932   2 Sheets-Sheet 1
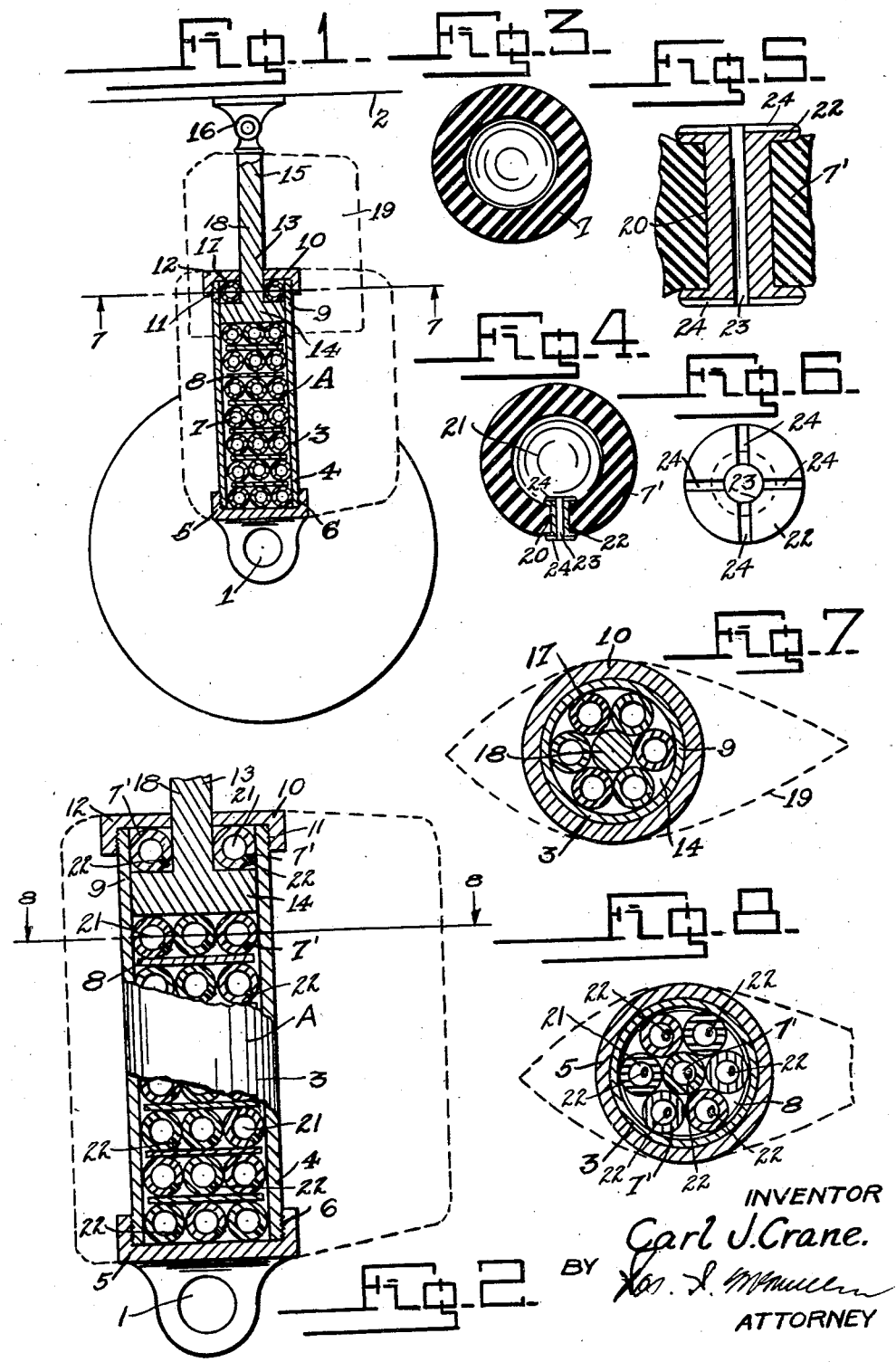
INVENTOR
Carl J. Crane.
BY
ATTORNEY

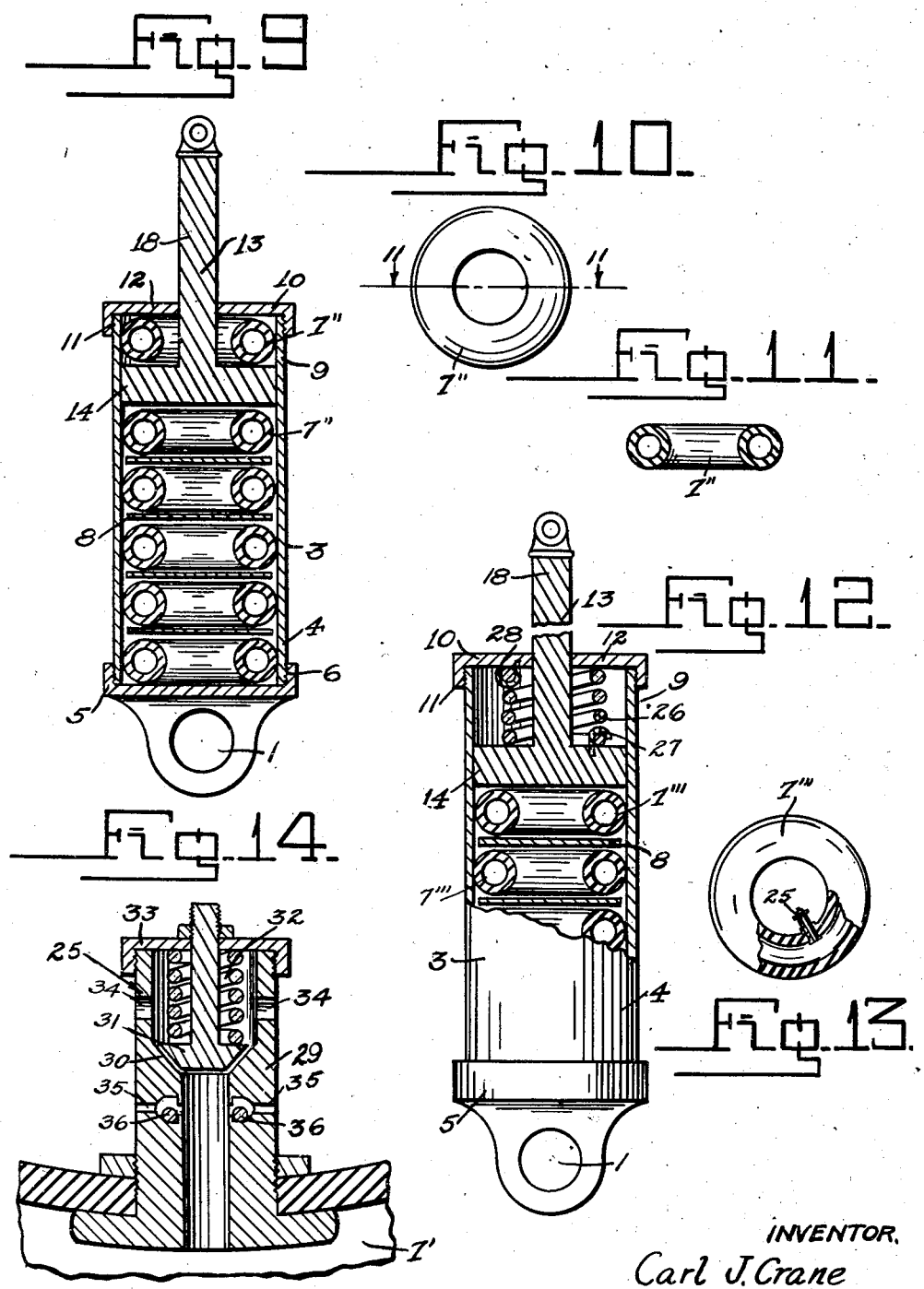

Patented Dec. 5, 1933

1,937,511

UNITED STATES PATENT OFFICE 1,937,511

SHOCK ABSORBER FOR VEHICLES

Carl J. Crane, Randolph Field, Tex.

Application April 29, 1932. Serial No. 608,263

3 Claims. (Cl. 267—65)

(Granted under the act of March 3, 1883, as amended April 30, 1928; 370 O. G. 757)

This invention described herein may be manufactured and used by or for the Government for Governmental purposes, without the payment to me of any royalty thereon.

This invention relates to shock absorbers for vehicles, and more particularly to devices of this character wherein hermetically sealed resilient compartments filled with gas are used as the resilient element or elements thereof particularly those which are adapted for use in the chassis, tail skids and the like of aircraft or similar devices.

One of the objects of this invention is to provide a shock absorber compression unit in which the deformation of my resilient compartments is taken advantage of to have a long travel with smooth action and minimum rebound.

Still another object of this invention is to provide a shock absorber compression unit which is simple in construction, compact, light in weight, durable, that is not substantially affected by changes in temperature, which will operate in any position and in which the resilient elements thereof are fully protected from the harmful influence of weather and light and which can be easily and economically replaced should they become damaged.

The usual type of shock absorbers heretofore used on aircraft, using rubber under compression for the resilient element or elements thereof have the disadvantage of a very small travel of the compression elements as compared to the present invention, therefore causing the shock absorber in present use to have little resiliency and cause a large amount of rebound and recoil to the system wherein they may be employed, such as on the landing gear system of aircraft.

It is therefore the aim and purpose of this invention to provide a shock absorber compression unit in which the large amount of deformation of my resilient gas filled compartments is taken advantage of for causing the shock absorber to have a maximum travel, thereby increasing the smooth operation of the shock absorber.

With the above and other objects and advantages in view the invention specifically consists in features of construction, arrangement and operation of parts which will hereinafter appear. For purposes of illustration the invention will be described and claimed with reference to the accompanying drawings in which like members distinguish like parts and in which:

Fig. 1 shows a vertical sectional view of this invention attached to the landing chassis of an airplane;

Fig. 2 is an enlarged vertical sectional view partly in elevation of another form of my invention;

Fig. 3 is an enlarged sectional view of one of my improved resilient compartments;

Fig. 4 is a modified form of resilient compartment;

Fig. 5 is an enlarged sectional detail view of a valve which may be used to carry out my invention;

Fig. 6 is a top plan view of one of the ends of the valve;

Fig. 7 is a horizontal cross sectional view of the invention taken on line 7—7 of Fig. 1;

Fig. 8 is a horizontal cross sectional view of the invention taken on lines 8—8 of Fig. 2.

Fig. 9 is a vertical sectional view of another modified form of my invention;

Fig. 10 is a plan view of another modified form of resilient compartment;

Fig. 11 is a cross sectional view thereof taken on line 11—11 of Fig. 8;

Fig. 12 is a vertical sectional view partly in elevation of another form of my invention;

Fig. 13 is a plan view partly in section of another modified form of resilient compartment, and Fig. 14 is a sectional detail view of a modified form of valve which may be used to carry out my invention.

In the illustrated embodiment characterizing this invention I preferably embody it in one of the legs or struts of the landing chassis or the like of an airplane as illustrated in Fig. 1 of the drawings. The axle 1 of the airplane is mounted upon the main body 2 thereof by means of my improved shock absorber generally indicated by A and in accordance with the preferred form of the invention comprises a housing 3 made of any light and strong suitable material and formed cylindrically internally and may be made streamlined externally so that it offers little, if any, more head resistance, in flight than an ordinary chassis strut.

One end 4 of the housing 3 is closed by means of a head or cap 5 which may be integrally formed with the housing 3 or attached thereto in any suitable manner such as by the threaded connection 6. This end 4 of the shock absorber compression unit A is adapted to be pivotally attached to the chassis axle 1.

The housing 3 is adapted to receive a plurality of layers of resilient compartments made of any suitable material such as india rubber and shown here as being hollow rubber balls 7. In order to stabilize or maintain the rubber balls 7 in position discs 8 are provided which separate the layers of the hollow rubber balls 7 each from the other. The hollow balls or compartments 7 constituting the resilient compartments are filled with gas under sufficient pressure so that all of the balls 7 will support the weight of the vehicle. The other end 9 of the housing 3 is closed by a head or cap 10 which is attached to the housing 3 in any suitable manner such as by the threaded connection 11. The head 10 is provided with an aperture and forms a guide bearing 12 for a plunger 13. The plunger 13 is mounted coaxially with and slidably in the guide bearing 12 and is provided with a piston-like head 14 slidably in the housing 3 in contact with the upper layers of gas filled compartments 7. The free end 15 of the plunger 13 is pivotally and rotatably secured to the underside of the fuselage 2 of the vehicle as at 16. The said fuselage 2 being adapted to move relatively to said axle 1 and against the action of the shock absorber A when subjected to shock such as that caused by the landing of the vehicle of which it is a part.

Surrounding the opposite side of the piston head 14 is a layer of similar compartments 17 abutting against the inner side of the cap 10 and the inner side of the piston-like head 14 of the plunger 13 and in circular formation around the portion of the piston rod 18 that is within the housing 3 as illustrated in Fig. 7 of the drawings. Now when the recoil occurs to the system the plunger 13 is moved violently upward toward the cap 10 and impacts with the compartments 17 which cushions the plunger 13 on its recoil stroke. Numeral 19 indicates a streamline wind-shield about the piston rod 18.

The compartment 7 may be provided in a modified form with a vent 20 which leads from the gas filled space 21 to the external surface of the compartment 7' as shown in Fig. 4. The vents 20 are provided with a valve 22 in the form of a button or bushing made of any suitable material, such as metal and provided with an opening 23. The opening 23 of the valve 22 permits escape of the confined gas either into or out of gas filled space 21 of the compartments 7' depending on the condition of compression or expanding of the compartments 7', and is of a capillary nature, i. e., substantially hair-like as to constrain the gas from immediately rushing out of the gas filled space 21 when the pressure of said gas increases by reason of the compressive force of the plunger 13 acting on these compartments 7' during impact of the vehicle upon the surface or while the vehicle rolls. By this construction improved means are provided for increasing the desirable qualities of shock absorption and reducing the amount of rebound or recoil of the system due to the time interval required for air to again return to the gas filled space 21 of the compartments 7' after the shock of landing the aircraft or vehicle has ended. In order to prevent closure of the restrictive opening 23 of the valve 22 by an adjacent compartment 7', undercut slots 24 are provided in the ends of the valves 22 as illustrated in Figs. 5 and 6 of the drawings.

Another form which my invention may take is illustrated in Fig. 9 of sheet 2 of the drawings wherein similar construction as that shown in Figs. 1 and 2, is disclosed except that in place of hollow compartments 7 or 7' I use toroidal compartments 7'' in exactly the same manner as the hollow spherical compartments 7 and 7' of Figs. 1 and 2.

The compartments 7'' may be provided in a modified form as illustrated in Fig. 13 of the drawings wherein the compartments 7''' are provided with compression leakage valves 25 in which case I will so use a device as illustrated in Fig. 12 of the drawings, wherein a recoil spring 26 in the form of a helical coil is provided in the space above the piston head 14 which is normally out of tension or compression but connected at one end to a hook 27 on the piston head 14 and at the other end to a hook 28 on the cap 10. Now upon impact of the vehicle using this form of shock absorber the downward movement of the piston head 14 distends the spring 26 so that upon the spending of the force of impact this spring 26 will act to overcome its condition of being in tension and will contract bringing with it the corresponding hooks on the piston head 14 and cap 10 and so returning the piston and parts to their original position.

The valve 25 used in my compartments 7''' is illustrated in Fig. 14 of the drawings and comprises a hollow housing 29 having a valve seat 30 for a valve head 31 of the valve 25. The valve head 31 has a gas tight fit against the valve seat 30 by means of a compression spring 32 which is held in place by means of a cap 33 which is screw-threaded on to the said housing 29. The housing 29 is provided with vent holes 34 to permit escape of the gas after passing valve head 31. At the lower end of the housing 29 is an annular series of holes 35 which are governed by ball valves 36.

The operation of my modified form of valve 25, used in my compartments 7''', is as follows: When the vehicle alights and impact takes place the gas in the compartments 7''' is highly compressed so that the pressure thereof is sufficient to overcome the action of the spring 32 acting on the valve head 31 and exhausts itself through said vents 34. Upon recoil of my shock absorber the pressure inside my compartments 7''' is diminished below that of the atmosphere which forces the ball valves 36 to open and thus permit air or other gas to fill my new compartments 7''' to equilibrium whereupon the shock absorber is ready for action again.

It will thus be seen that I have provided a highly novel, simple, and efficient form of shock absorber that is well adapted for all the purposes designated. Even though I have herein shown and described my device as comprising certain structural elements it is nevertheless to be undestood that changes may be made therein without departing from the spirit or scope of my invention.

Having described my invention what I claim as new and wish to secure by Letters Patent is:

1. A device of the character described wherein a hollow chamber is provided with a plurality of layers of resilient hollow compartments and wherein separator plates are mounted in said chamber and alternate with said layers of said compartments, a piston slidably mounted in said chamber, each compartment of said layers thereof having a bushing provided thereon, a capillary opening provided in said bushing and means on said bushing to prevent closure of said capillary opening.

2. A device of the character described wherein a hollow chamber is provided with a plurality of layers of resilient hollow compartments and wherein separator plates are mounted in said chamber and alternate with said layers of said compartments, a piston slidably mounted in said chamber, each compartment of said layers thereof having a bushing provided thereon, a capillary opening provided in said bushing and means on said bushing to prevent closure of said capillary opening, said means comprising undercut slots.

3. A device of the character described wherein a hollow chamber is provided with a plurality of layers of resilient hollow compartments and wherein separator plates are mounted in said chamber and alternate with said layers of said hollow compartments, a piston slidably mounted in said chamber, and an additional layer of resilient hollow compartments on the opposite side of said piston from that of the other of said layers of said compartments, each compartment of said layers thereof having a bushing provided thereon, said bushing having a capillary opening provided therein and means on said bushing to prevent closure of said capillary opening.

CARL J. CRANE.